United States Patent
Nagahama et al.

(10) Patent No.: US 10,634,825 B2
(45) Date of Patent: Apr. 28, 2020

(54) LIGHT-BLOCKING MATERIAL FOR OPTICAL DEVICES, AND PRODUCTION METHOD THEREFOR

(71) Applicant: KIMOTO CO., LTD., Saitama (JP)

(72) Inventors: Tsuyoshi Nagahama, Saitama (JP); Yasumaro Toshima, Saitama (JP)

(73) Assignee: KIMOTO CO., LTD., Saitama (JP)

( * ) Notice: Subject to any disclaimer, the term of this patent is extended or adjusted under 35 U.S.C. 154(b) by 86 days.

(21) Appl. No.: 15/322,836

(22) PCT Filed: May 19, 2015

(86) PCT No.: PCT/JP2015/064388
§ 371 (c)(1),
(2) Date: Dec. 29, 2016

(87) PCT Pub. No.: WO2016/006324
PCT Pub. Date: Jan. 14, 2016

(65) Prior Publication Data
US 2017/0146701 A1  May 25, 2017

(30) Foreign Application Priority Data

Jul. 9, 2014 (JP) ................ 2014-141816

(51) Int. Cl.
| | |
|---|---|
| *G02B 5/00* | (2006.01) |
| *G02B 1/16* | (2015.01) |
| *G03B 9/02* | (2006.01) |
| *G03B 9/08* | (2006.01) |
| *G03B 11/00* | (2006.01) |

(52) U.S. Cl.
CPC ............ *G02B 5/003* (2013.01); *G02B 1/16* (2015.01); *G03B 9/02* (2013.01); *G03B 9/08* (2013.01); *G03B 11/00* (2013.01); *G02B 2207/121* (2013.01)

(58) Field of Classification Search
CPC . G02B 5/00; G02B 5/003; G02B 5/04; G02B 1/16; G02B 1/04; G02B 1/10; G02B 7/02; G02B 2207/121; C09D 7/1216; C09D 7/1266; C09D 5/006; C09D 163/00; C04B 35/46; C04B 35/48; C03B 9/02; G03B 9/02; G03B 9/08; G03B 11/00
USPC ........ 359/614, 580, 885; 428/220, 212, 328; 252/582
See application file for complete search history.

(56) References Cited

U.S. PATENT DOCUMENTS

| | | | |
|---|---|---|---|
| 4,004,851 A | 1/1977 | Negishi et al. | |
| 2011/0200810 A1* | 8/2011 | Kubota | G02B 1/04 428/220 |

FOREIGN PATENT DOCUMENTS

| | | | |
|---|---|---|---|
| JP | 47032419 | 8/1972 | |
| JP | 07319004 | * 12/1995 | ............... G02B 5/00 |
| JP | 2011186437 A | 9/2011 | |
| JP | 2013250440 A | 12/2013 | |

OTHER PUBLICATIONS

English translation of JP 07319004, Feb. 5, 2019.*

* cited by examiner

*Primary Examiner* — Jie Lei
(74) *Attorney, Agent, or Firm* — Bacon & Thomas, PLLC

(57) ABSTRACT

Provided is a method for producing a light-blocking material for optical devices which is provided with a light-blocking coat achieving low gloss while maintaining the necessary physical properties of a light-blocking coat, i.e. a light-blocking property, even when the light-blocking coat is formed extremely thinly. In the method for producing the light-blocking material for optical devices which is provided with the light-blocking coat, a coating liquid including at least a binder resin, black microparticles, and a dye is prepared. A dye including a metal such as chrome oxide, iron oxide, or cobalt oxide is preferably used as the dye. The coating liquid is subsequently applied to a base material, and dried to form the light-blocking coat.

17 Claims, No Drawings

LIGHT-BLOCKING MATERIAL FOR OPTICAL DEVICES, AND PRODUCTION METHOD THEREFOR

This application is a U.S. national phase filing under 35 U.S.C. § 371 of PCT Application. No. PCT/JP2015/064388, filed on May 19, 2015.

TECHNICAL FIELD

The present invention relates to a method for producing a light-blocking material having a light-blocking coat suitably used in light-blocking parts of various optical devices and capable of achieving low gloss while maintaining a light-blocking property and other necessary physical properties particularly even when the light-blocking coat is formed to be extremely thin, and a light-blocking material produced by this method.

BACKGROUND ART

As a light-blocking material used for light-blocking parts as typified by a shutter and diaphragm of optical devices, there is known a light-blocking film obtained by providing a light-blocking coat including black microparticles and an organic filler on a film substrate made of a synthetic resin (Patent Document 1).

RELATED ART DOCUMENTS

Patent Document

Patent Document 1: Japanese Unexamined Patent Publication (Kokai) No. H07-319004

SUMMARY OF THE DISCLOSED SUBJECT MATTER

In the patent document 1, since a coating liquid including only black microparticles as a coloring component is used when forming a light-blocking coat, a light-blocking property, which is one of the necessary physical properties, was sometimes insufficient in use purposes requiring a thinner light-blocking coat (for example, application to an ultrathin spacer to be installed between a plurality of lenses used in a lens part of a photographing optical system in a camera as an example of optical devices). The light-blocking property can be improved by increasing an amount of black microparticles to be blended, however, a degree of unevenness (recesses in particular) on the light-blocking coat surface decreases due to the thinness, consequently, a delustering property on the light-blocking coat surface was liable to decline.

When the delustering property, which is an ability of suppressing reflection of an incident light on the light-blocking coat surface, declines, an incident light reflects on the light-blocking coat surface and the reflection appears as a defective called ghosts inside the optical device, which causes a decline of the product performance. As explained above, when a light-blocking coat is formed to be thinner by using the technique in the patent document 1, low gloss was not achieved while maintaining the light-blocking property of the light-blocking coat.

As an aspect of the present invention, there is provided a method for producing a light-blocking material for optical devices which is provided with a light-blocking coat achieving low gloss while maintaining necessary physical properties of light-blocking coats, such as a light-blocking property, even when the light-blocking coat is formed to be extremely thin, and a light-blocking material for optical devices produced by this method. As another aspect of the present invention, there is provided a coating liquid for forming light-blocking coats capable of forming extremely thin light-blocking coats, which achieves low gloss while maintaining the light-blocking property.

The present inventors studied on various elements for maintaining the light-blocking property and achieving low gloss even when forming an extremely thin light-blocking coat. As a result, they found that, by blending a dye including a metal in addition to black microparticles (synonymous with a black fine powder) as a coloring component, the light-blocking property can be maintained and low gloss can be achieved even when the light-blocking coat is formed to be thin.

Namely, a method according to the present invention for producing a light-blocking material for optical devices provided with a light-blocking coat comprises the steps of preparing a coating liquid including at least a binder resin, black microparticles and a dye, applying the coating liquid to a substrate and drying to form a light-blocking coat.

The substrate may be removed as needed after forming the light-blocking coat so that the light-blocking material for optical devices of the present invention may be configured to be a single layer of the light-blocking coat.

A light-blocking material for optical devices according to the present invention provided with a light-blocking coat including at least a binder resin and black microparticles, wherein the light-blocking coat is formed by using a coating liquid including a dye together with the binder resin and black microparticles and specular gloss thereof at 60 degrees is adjusted to be less than 4%.

The light-blocking material for optical devices of the present invention is not limited to the multilayer structure including a substrate and may be configured to be a single layer of a light-blocking coat. In the latter case, it can be obtained by using as the substrate those subjected to a release treatment for obtaining releasability so as to release it after formation of the light-blocking coat.

A coating liquid for forming light-blocking coats according to the present invention is a coating liquid for forming light-blocking coats, which is a coating liquid for forming a light-blocking coat provided to a light-blocking material for optical devices, wherein the coating liquid includes at least a binder resin, black microparticles, a dye and a solvent.

According to the method of the invention explained above, since a coating liquid including a dye together with black microparticles is used, a light-blocking material capable of maintaining a light-blocking property and achieving low gloss can be obtained even when forming the light-blocking coat to be extremely thin.

According to a light-blocking material for optical devices produced by the method of the invention explained above, since a light-blocking coat is formed by using a coating liquid including a dye together with black microparticles, even when the light-blocking coat is formed to be thin, a sufficient and necessary light-blocking property (will be explained later) can be secured and low gloss is realized (G60 is less than 4%).

According to the coating liquid of the invention explained above, since a dye is included together with black microparticles, it is easy to form a light-blocking coat having an extremely thin thickness capable of achieving low gloss while maintaining a light-blocking property. As explained above, since the coating liquid used in the patent document 1 includes only black microparticles as a coloring component, the light-blocking property was insufficient for use purposes requiring thinner light-blocking coats. When a blending amount of black microparticles was increased, the light-blocking property was improved, while a delustering property on the light-blocking coat surface declined resulting in being unable to be used as a thin film for light-blocking coats.

EXEMPLARY MODE FOR CARRYING OUT THE DISCLOSED SUBJECT MATTER

A light-blocking material for optical devices according to one embodiment (the present example) of the present invention can be used suitably for light-blocking parts in optical devices, such as cameras (including mobile phones with a camera) and projectors, and is an example of a multilayer structure wherein a light-blocking coat is formed on at least one surface of a substrate. Note that the light-blocking material for optical devices of the present invention is not limited to the multilayer structure of the present example and may be configured to be a single layer of a light-blocking coat when it can be handled alone. The light-blocking coat of the present example is configured to include at least a binder resin, black microparticles and a dye.

A thickness of a light-blocking coat (synonymous with film thickness Tt, which will be explained later on) may be changed arbitrarily in accordance with use purposes of the light-blocking material, however, normally 2 μm to 15 μm is preferable, 2 μm to 12 μm is more preferable and 2 μm to 10 μm or so is furthermore preferable. This is to respond to the tendency of demanding thinner light-blocking coats (for example, approximately 6 μm or less) in recent years. In the present example, as will be explained later on, since a coating liquid including a dye preferably at a predetermined ratio together with black microparticles is used, even when a light-blocking coat is formed to have an extremely thin thickness (for example, approximately 6 μm or less and preferably 2 to 6 μm or so), light gloss is easily obtained, it is easy to prevent arising of pin holes, etc. on the light-blocking coat, and a necessary and sufficient light-blocking property (for example, an optical transmission concentration exceeds 4.0, preferably 5.0 or higher and more preferably 5.5 or higher) can be obtained easily. When formed to be 15 μm or less, cracks on the light-blocking coat can be prevented easily.

The light-blocking coat of the present example is formed by using a coating liquid including black microparticles and a dye, so that even when made to be thinner as, for example, approximately 6 μm or less, low gloss is maintained, such that the specular gloss at 60 degrees (G60) is less than 15%, preferably less than 10% and more preferably less than 4%, while maintaining the necessary and sufficient light-blocking property (explained above). Note that the light-blocking coat of the present example also achieves low values in specular gloss at 85 degrees (G85) and at 20 degrees (G20) easily besides G60 in the case of being formed thinner in the same way. Specifically, while keeping G60 at a low value as above, it is easy to keep G85 to be less than 30%, preferably less than 25% and more preferably less than 20% and easy to keep G20 to be less than 1%, preferably less than 0.5% and more preferably less than 0.1%.

Specular gloss is a parameter indicating a degree of reflection of an incident light on the light-blocking coat surface. It is determined that the smaller a value thereof, the lower the gloss is and the lower the gloss is, the higher the delustering effect is. The specular gloss at 60 degrees is a parameter indicating that, assuming that the vertical direction for the light-blocking coat surface is 0 degree, how much of 100 light entering at an angle 60 degrees inclined from the 0 degree reflects to a light receiving part at an angle of 60 degree on the opposite side (enters to the light receiving part). The specular gloss at 85 degrees and at 20 degrees are based on the same idea.

In the present example, since the light-blocking coat is formed by using a coating liquid including black microparticles and a dye at a predetermined ratio, low gloss can be achieved while maintaining a sufficient light-blocking property in the light-blocking material as a whole and a sufficient delustering effect is provided to the light-blocking coat surface.

Next, an explanation will be made on one embodiment of the method for producing a light-blocking material for optical devices having the configuration above.

(1) First, a coating liquid for forming light-blocking coats is prepared. A coating liquid for forming a light-blocking coat used in the present example includes at least a binder resin, black microparticles, a dye and a solvent.

As a binder resin, for example, a poly(meth)acrylic acid-type resin, polyester resin, polyvinyl acetate resin, polyvinyl chloride, polyvinyl butyral resin, cellulose-type resin, polystyrene/polybutadiene resin, polyurethane resin, alkyd resin, acrylic resin, unsaturated polyester resin, epoxy ester resin, epoxy resin, acryl polyol resin, polyester polyol resin, polyisocyanate, epoxy acrylate-type resin, urethane acrylate-type resin, polyether acrylate-type resin, polyether acrylate-type resin, phenol-type resin, melamine-type resin, urea-type resin, diallyl phthalate-type resin and other thermoplastic resins or thermosetting resins may be mentioned; and they may be used alone or as a mixture of two or more kinds. When used for a heat resistant use purpose, a thermosetting resin is preferably used.

A content of a binder resin in a non-volatile content (solid content) included in the coating liquid is preferably 20 wt % or greater, more preferably 30 wt % or greater, and furthermore preferably 40 wt % or greater. When it is 20 wt % or greater, a decline of adhesiveness of the light-blocking coat to the substrate is prevented easily. On the other hand, a content of the binder resin in the non-volatile content in the coating liquid is preferably 70 wt % or less, more preferably 65 wt % or less and furthermore preferably 60 wt % or less. When it is 70 wt % or less, a decline of necessary physical properties (a light-blocking property, etc.) of the light-blocking coat is prevented easily.

Black microparticles are blended to color the binder resin with black so as to give a light-blocking property to a dried coating (light-blocking coat). As black microparticles, for example, carbon black, titanium black, aniline black, iron oxide, etc. may be mentioned. Among them, carbon black is particularly preferably used because it can provide the coating with both of the light-blocking property and an antistatic property at the same time. The reason why the antistatic property is also required in addition to the light-blocking property is that, after producing the light-blocking material, workability is taken into account when cutting into a predetermined shape and setting the cut products (light-blocking members) as parts in optical devices.

Note that when not using carbon black as the black microparticles, a conductive agent or antistatic agent may be blended in addition to the black microparticles.

To give a sufficient light-blocking property to the coating, the smaller an average particle diameter of the black microparticles is, the more preferable. In the present example, those having an average particle diameter of, for example, less than 1 µm and preferably 500 nm or less may be used.

A content of black microparticles in a non-volatile content (solid content) included in the coating liquid is preferably 5 wt % or greater, more preferably 10 wt % or greater and preferably 20 wt % or less. When it is 5 wt % or greater, a decline of the light-blocking property as a necessary physical property of the light-blocking coat is prevented easily. When it is 20 wt % or less, adhesiveness and abrasion-resistance of the light-blocking coat are improved and a decline of strength of the coating and high costs are prevented easily.

A dye to be included together with the black microparticles in the coating liquid is blended for realizing low gloss on the light-blocking coat surface while maintaining the light-blocking property of the light-blocking coat even when an application amount of the coating liquid is reduced to attain an extremely thin thickness of the light-blocking coat as a coating after drying. As a result, in combination with blending of a later-explained matting agent, a sufficient delustering effect can be obtained on the light-blocking coat surface.

A kind of dye which may be used in the present invention is not limited (particularly the color) and, for example, a black dye and other dyes (blue alone and mixtures of blue and red or blue and yellow, etc.) may be mentioned. Among them, as those capable of attaining the object of blending as explained above most effectively, black dyes, etc. including a metal, such as chromium oxide, iron oxide and cobalt oxide, may be mentioned. When using a dye as together with black microparticles, it is possible in a light-blocking coat formed to be extremely thin to maintain the light-blocking property and achieve low gloss on a surface of the light-blocking coat.

Specific examples of a black dye including a metal are those listed in the table below.

TABLE 1

| C.I. Solvent Black 27 | Orasol Black X51 (BASF), Black C-832 (Chuo synthetic Chemical Co., Ltd.), Valifast Black 3820, Valifast Black 3830, Valifast Black 3840, Valifast Black 3840L (Orient Chemical Industries Co., Ltd.) |
| --- | --- |
| C.I. Solvent Black 29 | Orasol Black X55 (BASF), Valifast Black 3808, Valifast Black 3877 (Orient Chemical Industries Co., Ltd.) |
| C.I. Sol. Black 7 | Black S, Black SF, Black 109 (Chuo synthetic Chemical Co., Ltd.) Valifast Black 1821 (Orient Chemical Industries Co., Ltd.) |
| C.I. Sol. Black 3 | Black 141 (Chuo synthetic Chemical Co., Ltd.) |
| C.I. Acid Black 52 | Valifast Black 1815 (Orient Chemical Industries Co., Ltd.) |
| C.I. Solvent Black 22 | Aizen Spilon Black BH (Hodogaya Chemical Co., Ltd.) |
| C.I. Solvent Black 34 | Valifast Black 3804 (Orient Chemical Industries Co., Ltd.) |

As a blue dye, for example, Blue 44 C-531 composed of Sol. Blue 44 (produced by Chuo synthetic Chemical Company Ltd.), etc. may be mentioned. As a red dye, for example, Red C-431 composed of Sol. Red 218 (produced by Chuo synthetic Chemical Company Ltd.), etc. may be mentioned. As a yellow dye, for example, Yellow C-131 composed of Sol. Yellow 21 (produced by Chuo synthetic Chemical Company Ltd.), etc. may be mentioned.

In the present example, a dye may be used alone or as a mixture.

A content of a dye with respect to 100 parts by weight of a binder resin is preferably 1 part by weight or greater, more preferably 5 parts by weight or greater and preferably 30 parts by weight or less and more preferably 15 parts by weight or less. When 1 part by weight or greater, it is easy to obtain the effect of lowering glossiness on a light-blocking coat surface. When it is 30 parts by weight or less, a decline of adhesiveness is prevented easily, a decline of the light-blocking property as a necessary physical property of the light-blocking coat is prevented and an increase of glossiness on the light-blocking coat surface caused by an inclusion of a large amount of dye is prevented easily.

As a solvent, water, an organic solvent and a mixture of water and organic solvent, etc. may be used.

The coating liquid for forming light-blocking coats of the present example may be blended with a matting agent in addition to the components as explained above. By blending a matting agent, fine unevenness may be formed on a surface of the dried coating. Thereby, reflection of incident lights on the coating surface is reduced to decline glossiness (specular gloss) of the coating and it is expected to enhance a delustering property of the coating eventually.

Generally, there are organic-type and inorganic-type matting agents. As organic microparticles, for example, cross-linked acrylic beads (regardless of being transparent or colored), etc. may be mentioned. As inorganic microparticles, for example, silica, magnesium aluminometasilicate, titanium oxide, etc. may be mentioned. In the present example, inorganic microparticles may be also used, however, organic microparticles are used preferably because the delustering effect on the light-blocking surface can be obtained more easily while maintaining strength of the coating.

Note that, in the present example, "use of organic microparticles" includes the case of using inorganic microparticles together with organic microparticles in addition to the case of using only organic microparticles. When using inorganic microparticles together, a content of organic microparticles in the whole matting agent may be, for example, 90 wt % or greater and preferably 95 wt % or greater.

In the present example, in a certain particle diameter (explained later as one embodiment), those having a CV value (variation coefficient of particle size distribution) of a specific value or larger (broad products) may be used. Specifically, for example, a matting agent (preferably organic microparticles) having a CV value in a certain particle diameter of 20 or larger, preferably 25 or larger and more preferably 30 or larger may be used. When using a matting agent as such together with black microparticles and a specific dye, the delustering effect on the light-blocking coat surface is adjusted easily.

Note that a CV (coefficient of variation) value means a variation coefficient (also referred to as relative standard deviation) of a particle size distribution when used for preparing a coating liquid. This value indicates that at what level a spread of a particle diameter distribution (variation in the particle diameter) is with respect to an average value (calculated average diameter) and is normally obtained from "CV value (no unit)=(standard deviation/average value)". The smaller the CV value is, the narrower (sharp) the particle size distribution becomes, while the larger, the wider (broad) the particle size distribution becomes.

In the present example, a particle diameter of a matting agent to be used, which becomes a reference of the CV value above, may be determined with respect to a film thickness Tt of a light-blocking coat to be formed. It is considered based on the fact that a product form of the light-blocking material (particularly, a thickness of the total light-blocking material and a thickness of a light-blocking coat) varies depending on a use place in optical devices. Specifically, with respect to a film thickness Tt of a light-blocking coat to be formed, a matting agent having an average particle diameter corresponding to 35% or greater of Tt, preferably 40% or greater and more preferably 45% or greater, and 110% or less of Tt, preferably 105% or less and more preferably 100% or less or so may be used.

For example, when forming a light-blocking coat, wherein a thickness after drying corresponding to a film thickness Tt is 10 μm or less, a matting agent having an average particle diameter of 3.5 μm or so to 11 μm or so may be used. When forming a light-blocking coat with a thickness after drying of 6 μm, a matting agent having an average particle diameter of 2.1 μm or so to 6.6 μm or so may be used. When forming a light-blocking coat with a thickness after drying of 2 μm, a matting agent having an average particle diameter of 0.7 μm or so to 2.2 μm or so may be used.

Note that, in the present example, regardless of the CV value explained above, a mixture of a matting agent having a certain average particle diameter and another having a different average particle diameter may be also used as the matting agent. In that case, an average particle diameter of one of the matting agents has to belong to the range (35% to 110% of Tt) explained above with respect to the film thickness Tt of a light-blocking coat to be formed, however, more preferably both of the matting agents having an average particle diameter in the range above may be combined for use.

The film thickness Tt means a calculated average value of 10 different points on a light-blocking coat measured by using a film thickness meter Millitron 1202-D (produced by Mahr). An average particle diameter indicates a median diameter (D50) measured by using a laser diffraction type particle size distribution meter (for example, SALD-7000 produced by Shimazu Corporation, etc.).

A content of the matting agent is preferably 0.2 part by weight or greater, more preferably 0.5 part by weight or greater and furthermore preferably 1 part by weight or greater and preferably 10 parts by weight or less, more preferably 8 parts by weight or less and furthermore preferably 5 parts by weight or less with respect to 100 parts by weight of a binder resin. When blending a matting agent in the range as above in a coating liquid, it is possible to contribute to prevention of declines of various performances, such as dropping of a matting agent off from a light-blocking coat due to sliding of the light-blocking material to be finally obtained and a decline of a sliding property of the light-blocking material.

Also when not blending the matting agent as above, it is possible to realize the expected effects (a decline of specular gloss and an improvement of a delustering property of a coating explained above) by changing a kind, average particle diameter and content, etc. of black microparticles and by blending a lubricant (explained later), etc.

In the present example, a total amount of black microparticles, a dye and a matting agent in a coating liquid (a total amount of black microparticles and a dye when a matting agent is not included) may be, with respect to 100 parts by weight of a binder resin, preferably 50 parts by weight or greater, more preferably 60 parts by weight or greater and furthermore preferably 70 parts by weight or greater and preferably 170 parts by weight or less, more preferably 140 parts by weight or less and furthermore preferably 110 parts by weight or less. When black microparticles, a dye and matting agent (black microparticles and a dye when a matting agent is not included) are blended within the range as above, a sufficient light-blocking property is obtained easily while maintaining a sliding property of the coating.

When using a processed product of the light-blocking material produced in the present example for the purposes of not requiring the light-blocking coat to have a high sliding property, such as an ultrathin spacer to be incorporated between respective lenses, etc., it is not necessary to blend any lubricant (wax), which has been blended into the light-blocking coat conventionally. However, a lubricant may be blended in also in the case of being used for such purposes.

When adding a granular lubricant, both of an organic type and inorganic type may be used. For example, polyethylene wax, paraffin wax and other hydrocarbon-type lubricants, stearic acid, 12-hydroxy stearic acid and other fatty acid-type lubricants, oleic amide, erucamide and other amide-type lubricants, stearic acid monoglyceride and other ester-type lubricants, alcohol-type lubricants, metallic soaps, talc, molybdenum disulfide and other solid lubricants, silicon resin particles, poly tetra fluoro ethylene wax and other fluorine resin particles, cross-linked polymethylmethacrylate particles, cross-linked polystyrene particles, etc. may be mentioned. When blending a granular lubricant, use of an organic-type lubricant is particularly preferable. Also, when adding a lubricant, which is a liquid at normal temperature, fluorine-type compounds and silicon oil, etc. may be used, as well.

Note that as long as it is in a range of not undermining functions of the present invention, in accordance with need, additives, such as flame retardants, antibacterial agents, antifungal agents, antioxidants, plasticizers, leveling agents, fluidity control agents, defoaming agents and dispersants, may be blended into the coating liquid for forming light-blocking coats.

(2) Next, the prepared coating liquid for forming light-blocking coats is applied in an amount of attaining a film thickness Tt to a substrate, dried and, then, heated and pressurized, etc. as needed.

As a substrate, a polyester film, polyimide film, polystyrene film, polycarbonate film, and other synthetic resin films may be mentioned. Among them, a polyester film is preferably used, and an oriented, particularly, biaxially-oriented polyester film is particularly preferable in terms of being excellent in mechanical strength and dimension stability. Also, a polyimide film is preferably used for heat resistant purposes.

As the substrate, not to mention transparent ones, a thin-film metal plate, wherein a substrate itself has a light-blocking property and strength, may be also used besides foamed polyester films and synthetic resin films including black pigment, such as carbon black, or other pigment. In that case, as the substrate, those suitable to each use purpose may be selected. For example, when used as a light-blocking material and a high light-blocking property is required, a synthetic resin film including the same kind of black microparticles as those explained above or a thin-film metal plate may be used, while in other cases, a transparent or foamed synthetic resin film may be used. Since a sufficient light-blocking property as a light-blocking material can be obtained from the light-blocking coat itself formed by the later-explained method, when a synthetic resin film includes black microparticles, it is good enough to include to an extent that the synthetic resin film looks visually black, that is, the optical transmission density becomes 2 or so.

A thickness of the substrate is generally 6 μm to 250 μm or so in terms of strength and stiffness, etc. as a lightweight light-blocking material although it varies depending on the use purposes. In terms of improving adhesiveness to the light-blocking coat, the substrate may be subjected to an anchor treatment, corona treatment, plasma treatment or EB treatment as needed.

An application method of the coating liquid is not particularly limited and may be applied by a conventional well-known method (for example, dip coating, roll coating, bar coating, die coating, blade coating and air knife coating, etc.).

The coating liquid used in the present example has a specific gravity of approximately 0.9 to 1.2 or so and a solid content (NV) thereof is adjusted to normally 5% to 40% or so and preferably 10% to 30% or so. The coating liquid is applied to the substrate in an adhesion amount of normally 6 g/m² to 100 g/m², preferably 8 g/m² to 80 g/m² and more preferably 10 g/m² to 60 g/m² or so.

Through the steps above, a light-blocking material is obtained, wherein a light-blocking coat is formed to have a film thickness Tt on a substrate. Note that, as explained above, the light-blocking material for optical devices in the present invention is not limited to the multilayer structure including a substrate and may be configured to be a single layer of a light-blocking coat. When configuring a light-blocking material for optical devices with a single layer of the light-blocking coat, those subjected to processing for providing releasability (release treatment) for after forming a light-blocking coat (film formation) are used as the substrate and removed after film formation, so that a light-blocking material for optical devices configured to be a single layer of a light-blocking coat can be obtained.

According to the present example, a coating liquid including a dye (preferably a black dye including a metal) together with black microparticles is used for producing a light-blocking material, wherein a light-blocking coat is formed on a substrate. Therefore, even when the light-blocking coat is formed to be extremely thin (for example, 6 μm or less), a light-blocking material capable of maintaining a light-blocking property and achieving low gloss can be obtained.

According to the light-blocking material for optical devices produced by the method according to the present example, since a light-blocking coat is formed by using a coating liquid including a dye together with black microparticles, even when the light-blocking coat is formed to be extremely thin (for example, 6 μm or less), a light-blocking property can be maintained and low gloss (G60 being less than 4%) can be achieved.

Use purposes requiring thinner light-blocking coats are listed below. For example, in a camera as an example of optical devices, a plurality of lenses are used at a lens portion of a photographing optical system and an ultrathin spacer is incorporated between respective lenses, and it is particularly beneficial in the case of applying the light-blocking material to be obtained by the method of the present invention to those spacers and an inner wall of the photographing optical system, etc. It is needless to mention that it is applicable to a conventionally used shutter, diaphragm and other parts.

Since a coating liquid including a dye together with black microparticles is used in the present example, it is possible to form a light-blocking coat capable of achieving low gloss and having an extremely thin thickness (for example, 6 μm or less) while maintaining the light-blocking property.

EXAMPLES

Below, the present invention will be explained furthermore with examples. Note that "part" and "%" are based on weight unless otherwise mentioned.

1. Preparation of Light-Blocking Material Samples

Experimental Examples 1-1 to 8-3

A black PET film having a thickness of 25 μm (Lumirror X30: Toray Industries, Inc.) was used as a substrate, and coating liquids 'a' to 'h' of the formulas below were applied respectively on both surfaces thereof by using a bar coating method. Contents (parts in terms of solid content) of acryl polyol, etc. in respective coating liquids are shown in Table 2. The respective coating liquids were all prepared to have a solid content of 13.5%.

After that, light-blocking coats A1 to H3 were formed after drying, so that light-blocking material samples of respective experimental examples were produced. Adhesion amounts of respective coating liquids are shown in Table 3 below.

<Formulas of Coating Liquids 'a' to 'h' for Forming Light-Blocking Coat>

| | |
|---|---|
| * acryl polyol (solid content 50%) (ACRYDIC A807: DIC Corporation) | 153.8 parts |
| * isocyanate (solid content 75%) (BURNOCK DN980: DIC Corporation) | 30.8 parts |
| * carbon black (average particle diameter 25 nm) (TOKABLACK #5500: Tokai Carbon Co., Ltd.) | 24 parts |
| * dye listed in Table 1 (not included in coating liquid 'h') | parts listed in Table 1 |
| * matting agent (average particle diameter 2.0 μm) | 5 parts |
| * methyl ethyl ketone and toluene | 745.16 to 934.18 parts |

TABLE 2

| | Binder Resin | | | | | Dye | | | | | |
|---|---|---|---|---|---|---|---|---|---|---|---|
| | (Resin Content) | | | | | | | | | | Absorbable |
| Coating Liquid | Acryl Polyol | Isocyanate | Total | Carbon Black | Matting Agent | X1 | X2 | X3 | X4 | Color | Wavelength Range (nm) |
| a | 76.9 | 23.1 | 100 | 24 | 5 | 0.5 | — | — | — | Black | 380-750 |
| b | | | | | | 1.8 | — | — | — | Black | 380-750 |
| c1 | | | | | | 5 | — | — | — | Black | 380-750 |
| c2 | | | | | | 14 | — | — | — | Black | 380-750 |
| c3 | | | | | | 16 | — | — | — | Black | 380-750 |

TABLE 2-continued

| | Binder Resin | | | | | Dye | | | | | |
|---|---|---|---|---|---|---|---|---|---|---|---|
| | (Resin Content) | | | | | | | | | | Absorbable |
| Coating Liquid | Acryl Polyol | Isocyanate | Total | Carbon Black | Matting Agent | X1 | X2 | X3 | X4 | Color | Wavelength Range (nm) |
| c4 | | | | | | 30 | — | — | — | Black | 380-750 |
| d | | | | | | 31 | — | — | — | Black | 380-750 |
| e | | | | | | — | 1.2 | — | — | Blue | 450-495 |
| f | | | | | | — | 5 | 5 | — | Green | 450-590 |
| g | | | | | | — | 5 | — | 5 | Purple | 450-750 |
| h | | | | | | — | — | — | — | | — |

Note that, in Table 2, dye X1 is a black dye composed of Sol. Black 27 and absorbs a ray having a wavelength range of 380 to 750 nm (product name: Black C-832 produced by Chuo synthetic Chemical Co., Ltd.), dye X2 is a blue dye composed of Sol. Blue 44 and absorbs a ray having a wavelength range of 450 to 495 nm (product name: Blue 44 C-531 produced by Chuo synthetic Chemical Co., Ltd.), dye X3 is a red dye composed of Sol. Red 218 and absorbs a ray having a wavelength range of 620 to 750 nm (product name: Red C-431 produced by Chuo synthetic Chemical Co., Ltd.) and dye X4 is a yellow dye composed of Sol. Yellow 21 and absorbs a ray having a wavelength range of 570 to 590 nm (product name: Yellow C-131 produced by Chuo Synthetic Chemical Co., Ltd.).

2. Evaluation

The obtained light-blocking material samples obtained in the respective experimental examples were evaluated on physical properties by the methods below. The results are shown in Table 3. Note that Table 3 also shows application amounts of coating liquids in Table 1 and film thicknesses of formed light-blocking coats, etc.

Note that evaluation of a light-blocking property in (1) below was made by using samples formed by applying respective coating liquids of formulas in the respective experimental examples above in an adhesion amount of 14 g/m² on one surface of a transparent polyethylene terephthalate film (Lumirror T60: Toray Industries, Inc.) having a thickness of 25 μm and drying.

(1) Evaluation on Light-Blocking Property Optical transmission densities of samples in respective experimental examples were measured based on JIS-K7651:1988 by using an optical densitometer (TD-904: Gretag Macbeth) to evaluate a light-blocking property based on the references below. Note that a UV filter was used in the optical density measurement.

○: Optical transmission density exceeded 4.0 (excellent).
x: Optical transmission density was 4.0 or less (defective).

(2) Evaluation on Conductivity

Surface resistivity (Ω) of light-blocking material samples obtained in the respective experimental examples was measured based on JIS-K6911:1995 and conductivity was evaluated based on the references below.

○: Surface resistivity was $1.0×10^6 Ω$ or less (excellent).
Δ: Surface resistivity exceeded $1.0×10^6 Ω$ and $1.0×10^{10} Ω$ or less (preferable).
x: Surface resistivity exceeded $1.0×10^{10} Ω$ (defective).

(3) Evaluation of Delustering Property

On the light-blocking material samples obtained in the respective experimental examples, specular gloss (unit: %) at 60 degrees (G60) on the light-blocking coat surfaces was measured based on JIS-Z8741:1997 by using a glossimeter (product name: VG-2000, Nippon Denshoku Industries Co., Ltd.) and evaluated based on the references below. Specular gloss (unit: %) at 20 degrees and 85 degrees (G20 and G85) was also measured in addition to G60 and evaluated based on the references below.

It was observed that the smaller the respective measurement values in G20, G60 and G85 were, the lower the glossiness was, and that the lower the glossiness, the more excellent in a delustering property.

[G60]

⊚⊚: Glossiness was less than 4% (very excellent).
⊚: Glossiness was 4% or more and less than 10% (excellent).
○: Glossiness was 10% or more and less than 15% (preferable).
x: Glossiness was 15% or more (defective).

[G20]

⊚⊚: Glossiness was less than 0.1% (very excellent).
⊚: Glossiness was 0.1% or more and less than 0.5% (excellent).
○: Glossiness was 0.5% or more and less than 1% (preferable).
x: Glossiness was 1% or more (defective).

[G85]

⊚⊚: Glossiness was less than 20% (very excellent).
⊚: Glossiness was 20% or more and less than 25% (excellent).
○: Glossiness was 25% or more and less than 30% (preferable).
x: Glossiness was 30% or more (defective).

TABLE 3

| | Coating Liquid | | | Light-blocking coat | | Performances | | | | |
|---|---|---|---|---|---|---|---|---|---|---|
| | Formula | Dye Blending Amount/ 100 parts of Resin Content (part) | Adhesion Amount (g/m²) | Kind | Film Thickness (μm) | Light-Blocking Property | Conductivity | Delustering Property | | |
| Experimental example | | | | | | | | G20 | G60 | G85 |
| 1-1 | a | 0.5 | 24 | A1 | 5.5 | ○ | ○ | ◎◎ | ○ | ○ |
| 1-2 | a | | 28 | A2 | 6 | ◎ | ○ | ◎◎ | ○ | ○ |
| 1-3 | a | | 46 | A3 | 8 | ◎ | ○ | ◎◎ | ○ | ◎ |
| 2 | b | 1.8 | 14 | B | 5.5 | ◎ | ○ | ◎◎ | ◎ | ◎ |
| 3-1 | C1 | 5 | 14 | C1 | 4 | ◎ | ○ | ◎◎ | ◎◎ | ◎ |
| 3-2 | C2 | 14 | 14 | C2 | 4 | ◎ | ○ | ◎◎ | ◎◎ | ◎ |
| 3-3 | C3 | 16 | 14 | C3 | 4 | ◎ | ○ | ◎◎ | ◎ | ◎ |
| 3-4 | C4 | 30 | 14 | C4 | 4 | ◎ | ○ | ◎◎ | ◎ | ◎ |
| 4 | d | 30.5 | 14 | D | 4 | ◎ | ○ | ◎◎ | ○ | ○ |
| 5 | e | 1.2 | 24 | E | 5.5 | ◎ | ○ | ◎◎ | ◎ | ◎ |
| 6 | f | 10 | 14 | F | 4 | ◎ | ○ | ◎◎ | ◎◎ | ◎ |
| 7 | g | 10 | 14 | G | 4 | ◎ | ○ | ◎◎ | ◎◎ | ◎ |
| 8-1 | h | 0 | 28 | H1 | 6 | X | ○ | ◎◎ | ○ | ○ |
| 8-2 | h | | 50 | H2 | 10 | X | ○ | ◎◎ | X | ○ |
| 8-3 | h | | 100 | H3 | 20 | ◎ | ○ | ◎◎ | X | X |

3. Consideration

As shown in Table 2 and Table 3, when using a coating liquid blended with a dye together with carbon black (those except for coating liquid 'h') (those except for experimental examples 8-1 to 8-3), usefulness of obtained light-blocking coat was confirmed (experimental examples 1-1 to 7). Among them, light-blocking coats obtained from experimental examples 2, 3-1 to 3-4 and 5 to 7 using coating liquids, wherein a blending amount of a dye with respect to 100 parts of a resin content was in a preferable range (1 to 30 parts) of the present invention, exhibited a more excellent delustering property than light-blocking coats of other experimental examples (1-1 to 1-3 and 4). Particularly, when a blending amount of a dye with respect to 100 parts of a resin content was in a more preferable range (5 to 15 parts) of the present invention (experimental examples 3-1, 3-2, 6 and 7), light-blocking coats to be obtained were furthermore excellent in the delustering property than those of other experimental examples (2, 3-3, 3-4 and 5).

On the other hand, it was confirmed that when a blending amount of a dye is zero (experimental examples 8-1 to 8-3), light-blocking coats to be obtained were not able to achieve both performances of the light-blocking property and delustering property compared with light-blocking coats of experimental examples 1-1 to 7.

The invention claimed is:

1. A method for producing a light-blocking material for optical devices provided with a light-blocking film, the method comprising the steps of
   preparing a coating liquid including at least a binder resin, black microparticles, at least one dye, and a matting agent,
   applying the coating liquid to a substrate, and
   drying to form a light-blocking film, wherein
   a total amount of dyes included in the coating liquid is 1 part by weight or more and 30 parts by weight or less with respect to 100 parts by weight of the binder resin, and
   a total of an amount of the black microparticles, the total of the amount of the dyes, and an amount of the matting agent included in the coating liquid is 29.5 parts by weight or more with respect to 100 parts by weight of the binder resin.

2. The method for producing a light-blocking material for optical devices according to claim 1, wherein a dye including a metal is used as the dye.

3. The method for producing a light-blocking material for optical devices according to claim 2, wherein those including at least either one of chrome oxide, iron oxide and cobalt oxide are used as the dye.

4. The method for producing a light-blocking material for optical devices according to claim 3, wherein a light-blocking film is formed to have a thickness of 6 μm or less.

5. The method for producing a light-blocking material for optical devices according to claim 3, wherein a coating liquid furthermore including a matting agent in an amount of 0.2 part by weight or greater and 10 parts by weight or less with respect to 100 parts by weight of a binder resin is used.

6. The method for producing a light-blocking material for optical devices according to claim 5, wherein organic microparticles are used as the matting agent.

7. The method for producing a light-blocking material for optical devices according to claim 2, wherein a light-blocking film is formed to have a thickness of 6 μm or less.

8. The method for producing a light-blocking material for optical devices according to claim 2, wherein a coating liquid furthermore including a matting agent in an amount of 0.2 part by weight or greater and 10 parts by weight or less with respect to 100 parts by weight of a binder resin is used.

9. The method for producing a light-blocking material for optical devices according to claim 8, wherein organic microparticles are used as the matting agent.

10. The method for producing a light-blocking material for optical devices according to claim 1, wherein a light-blocking film is formed to have a thickness of 6 μm or less.

11. The method for producing a light-blocking material for optical devices according to claim 1, wherein a coating liquid furthermore including a matting agent in an amount of 0.2 part by weight or greater and 10 parts by weight or less with respect to 100 parts by weight of a binder resin is used.

12. The method for producing a light-blocking material for optical devices according to claim 11, wherein organic microparticles are used as the matting agent.

13. A light-blocking material for optical devices provided with a light-blocking film including at least a binder resin, black microparticles, and a matting agent, wherein
the light-blocking film is formed by using a coating liquid including at least one dye together with the binder resin, the black microparticles, and the matting agent,
a total amount of dyes included in the light-blocking film is 1 part by weight or more and 30 parts by weight or less with respect to 100 parts by weight of the binder resin, and
a total of an amount of the black microparticles, the total of the amount of the dyes, and an amount of the matting agent included in the light-blocking film is 29.5 parts by weight or more with respect to 100 parts by weight of the binder resin, and
specular gloss of the light-blocking film at 60 degrees is adjusted to be less than 4%.

14. The light-blocking material for optical devices according to claim 13, wherein the light-blocking film is formed on at least one surface of a synthetic resin film substrate.

15. The light-blocking material for optical devices according to claim 14, which is used as a spacer incorporated between a plurality of lenses used in a photographing optical system in a camera.

16. The light-blocking material for optical devices according to claim 13, which is used as a spacer incorporated between a plurality of lenses used in a photographing optical system in a camera.

17. A coating liquid for forming light-blocking films, which is a coating liquid for forming a light-blocking film provided to a light-blocking material for optical devices, wherein
the coating liquid includes at least a binder resin, black microparticles, at least one dye, a matting agent, and a solvent, and
a total amount of dyes included in the coating liquid is 1 part by weight or more and 30 parts by weight or less with respect to 100 parts by weight of the binder resin, and
a total of an amount of the black microparticles, the total of the amount of the dyes, and an amount of the matting agent included in the coating liquid is 29.5 parts by weight or more with respect to 100 parts by weight of the binder resin.

* * * * *